United States Patent [19]

Schulman et al.

[11] 4,247,064

[45] Jan. 27, 1981

[54] LIMB RETENTION SYSTEM

[75] Inventors: Marvin Schulman, Broomall; Marcus Schwartz, Warminster, both of Pa.

[73] Assignee: The United States of America as represented by the Secretary of the Navy, Washington, D.C.

[21] Appl. No.: 46,066

[22] Filed: Jun. 6, 1979

[51] Int. Cl.$^3$ .................. B64D 25/02; B64D 25/10
[52] U.S. Cl. ........................ 244/122 AG; 280/753; 297/466
[58] Field of Search .......... 244/122 R, 122 A, 122 B, 244/122 AB, 122 AC, 122 AD, 122 AE, 122 AF, 122 AH, 122 AG, 141; 280/729, 733, 743, 753; 297/216, 465, 466; 128/377, 378

[56] References Cited

U.S. PATENT DOCUMENTS

| | | | |
|---|---|---|---|
| 2,709,557 | 5/1955 | Replogle et al. | 244/122 AG |
| 2,829,850 | 4/1958 | Culver | 244/122 AH |
| 2,873,122 | 2/1959 | Peras | 280/753 |
| 2,953,331 | 9/1960 | Halcomb et al. | 244/122 AG |
| 3,218,103 | 11/1965 | Boyce | 297/466 |

Primary Examiner—Charles E. Frankfort
Attorney, Agent, or Firm—R. S. Sciascia; Henry Hansen

[57] ABSTRACT

An ejection seat-mounted system for temporary secure attachment of the limbs of an aviator or other user to the seat during ejection, preventing limb flail and consequent injury. Initially, two rigid arm restraints are pivotably mounted to the sides of the seat in a nonobstructive raised position, and two rigid leg restraints are mounted at the sides of the seat in a substantially nonobstructive extended position to help keep the aviator's legs in place. After the aviator pulls a D-ring initiating ejection, a first gas generator is fired, causing pivoting of the two seat-mounted arm restraints through 135°, and retraction and rotation of the two seat-mounted leg restraints, each of which captures one of the aviator's limbs, draws it to the seat, and holds it in place on or with respect to the seat. At a predetermined time controlled by a timer or controller, after firing of the first gas generator, for separation of the aviator and his ejection seat, a second gas generator and appropriate explosive bolts are fired by the ejection sequencing system of the seat. Actuation of the bolts and of the second gas generator causes separation of all four restraints from the seat, leg restraints forwardly and arm restraints sideways, enabling separation of the aviator from the seat so that he can operate his parachute and make a safe landing.

4 Claims, 5 Drawing Figures

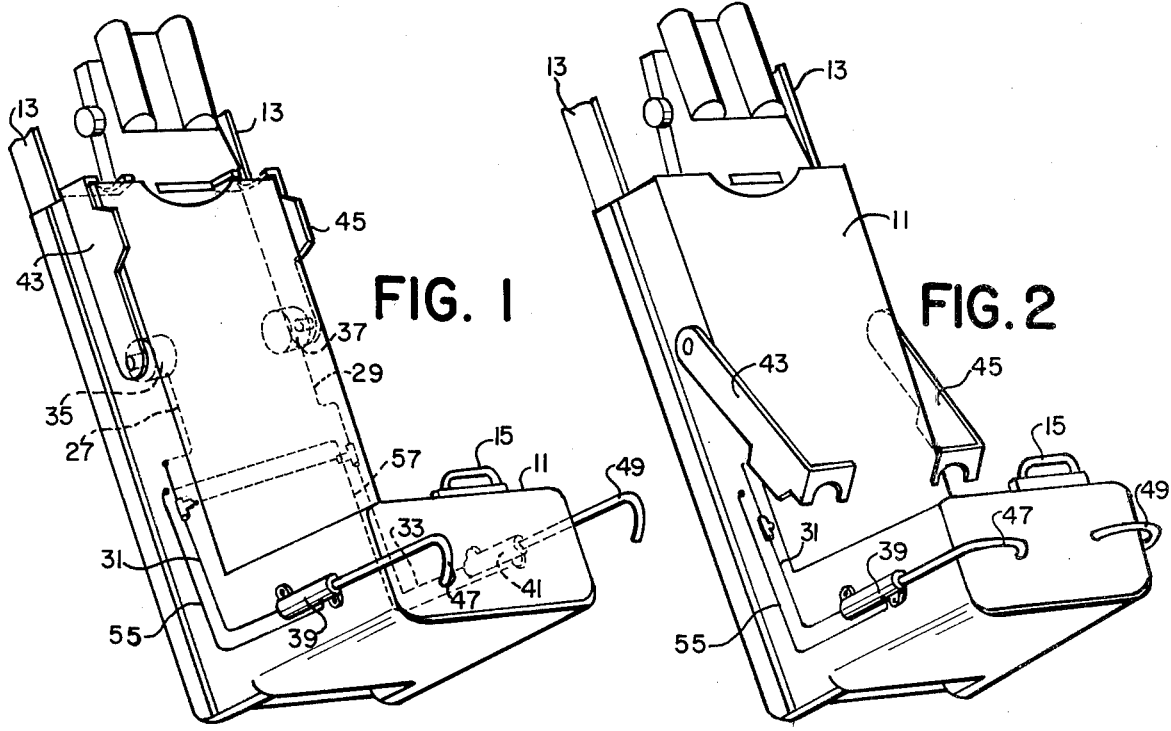
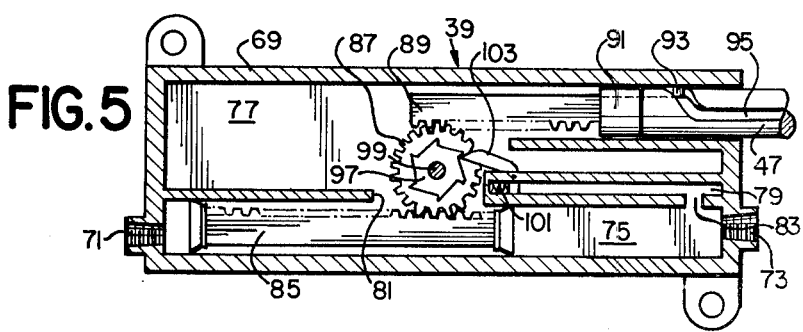
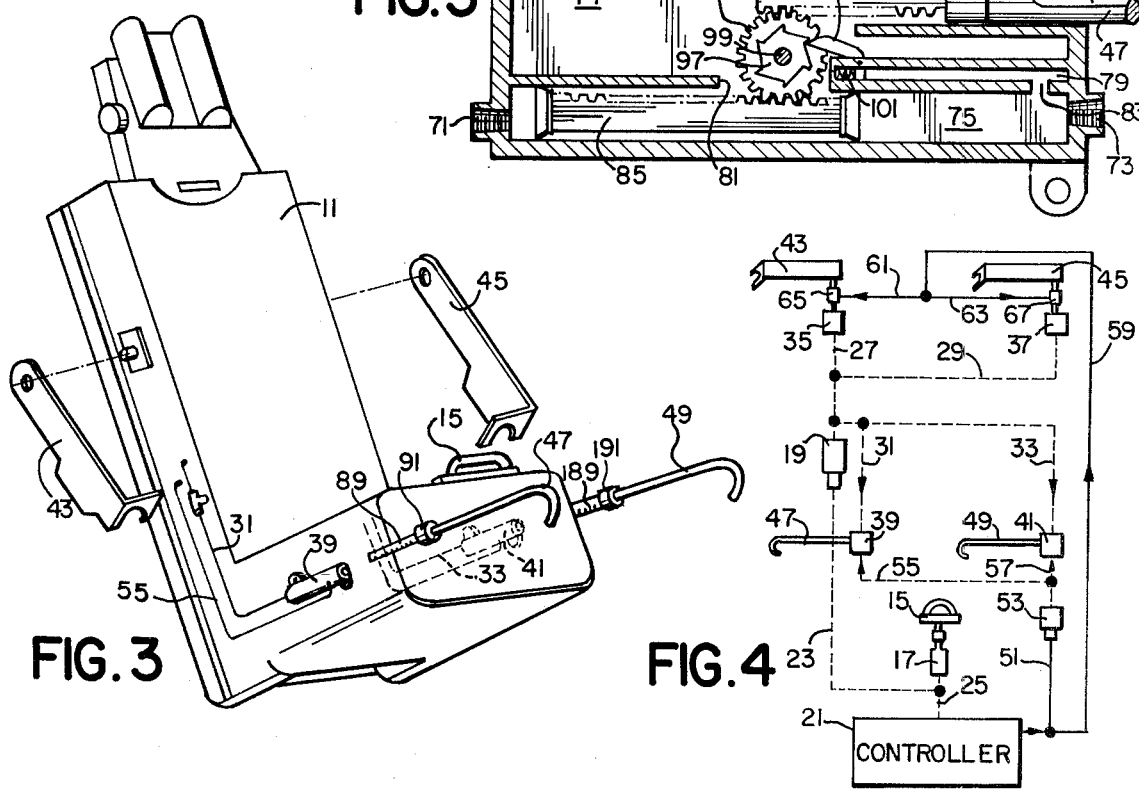

LIMB RETENTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates systems for protection from injury, and more particularly to systems for restraining the limbs of an occupant of a seat.

In vehicles such as aircraft, it is frequently necessary to effect escape of any occupant of an aircraft which is in a hazardous situation and likely to crash. One of the various devices utilized to effect such escape is the open ejection seat, which can be disposed on rails attached to the vehicle body and up which the ejection seat can be impelled by suitable propulsion means to be impelled away from the aircraft, after which the occupant of the seat is separated from the seat so that the occupant can utilize his parachute to insure a reasonably safe descent. However, the sudden force of ejection, windblast forces resulting from rapid passage of the ejection seat through the air, and the like can cause injury to the limbs of the user such as could result from limb flail. Injuries are especially likely to occur during the portion of the ejection sequence between ejection from the vehicle and parachute deployment, particularly because of limb flail injuries resulting from windblast forces. Also, the rapid sequencing necessary to effect successful ejection may not give the user sufficient response time to draw in his limbs, and if they are not drawn in, then his limbs could be caught on various portions of the aircraft or other vehicle structure, also possibly resulting in injury thereto. Aviators flying in ejectable aircraft require protection from high deceleration and windblast forces accompanying ejection, especially in the high 400 to 600 knot ejection speed range. Various systems intended to prevent such injuries limit leg separation, but still permit sufficient limb freedom of movement, and lack positive limb restraint or withdrawal means, so as to still permit possible resulting injury to the user's limbs. One aircraft limb protection system requires special clothing that the airman must wear prior to entering the aircraft, and also requires additional hookups after ingress. Also, use of this type of device is optional on the part of the airman, and no protection is provided if he chooses not to wear it. Other systems require the donning of devices such as leg garters which are fastened about the user's legs or feet for leg retention which is actuated if ejection is initiated. However, such additional equipment must first be put on, which is not always done, must be continuously worn while in the aircraft, require an additional hookup, and require additional equipment which the user must adjust. These systems furthermore do not provide protection for the arms and therefore are only partially effective. In others, there is no protection provided at all for either the arms or the legs. Other devices effect limb or arm capture if but only if the user pulls in and places his limbs or feet in appropriate positions near the seat. However, such devices do not allow for such factors as the need for user's response time, so that the user may not be able to pull his legs in time, resulting in inability of such devices to provide the needed protection. Furthermore, none of these devices also provide simultaneous positive capture and restraint of the user's arms as well as his legs, so that injury to his arms can still result even if his legs would be protected.

SUMMARY OF THE INVENTION

Accordingly, it is a general purpose of the present invention to provide a limb retention system capable of protecting the limbs of the user such as during ejection or other potentially hazardous situation.

Other objects of the present invention are to provide a vehicle escape system capable of providing the user with an effective limb retention system to prevent injury due to flailing of the arms and legs following ejection, especially at air speeds over 200 knots, resulting from high deceleration and aerodynamic forces.

Further objects of the present invention are to provide a limb restraint system capable of capturing, withdrawing and restraining the arms and legs of the user within the confines of predetermined safe envelope dimensions, which is self-actuated and does not require separate actuation apart from actuation of the ejection system for its proper operation, which reduces the possibility of limb flail injury, which provides protection to the user's arms and legs, which reduces the possibility of injury to the arms and legs of the user, whose operation can be integrated with that of an ejection escape system, which is capable of protecting the user from the effects of windblast, which is capable of being removed at the appropriate time for desired seat/man separation, which does not require special equipment or garments or hookups for proper operation, which provides protection for both arms and legs, which positively engages each of the user's limbs, which need not be individually designed or configured for each individual user, which does not require special attachments by the pilot, which does not require that the pilot bring his arms or legs into predetermined positions for proper operation of the system, and which securely retains in proper position each of the user's limbs.

Still further objects of the present invention are to provide an ejection seat mounted system for temporary attachment of a user's limbs to the seat during ejection, preventing limb flail and consequent injury, which is self-operated and does not require action by the user for its effective operation, which positively captures and withdraws the user's limbs, which securely holds each of the user's limbs in place during ejection but is readily removable at the desired time for seat/man separation, which does not require special equipment or garments for the user to wear, which does not require extra gear to wear or stow away when not in use, which eliminates damage from handling of such equipment, which need not be individually designed for each different user, which does not require any additional attachments by the user, which does not require additional disconnects, which does not require the user to preplace his limbs in a certain position for proper operation of the system, and which confines the arms and legs of the user within the confines of predetermined safe envelope dimensions.

Briefly, these and other objects of the present invention are accomplished by a seat mounted arm and leg retention system which can be connected to an ejection seat. Initially, two arm retainers are disposed out of the way in a raised position, while two leg retainers are disposed extended and vertically aligned so that the user's legs cannot be engaged. With actuation of the ejection seat, a gas generator is actuated whose gases are provided to two rotary motors and two linear retractors or cylinders. Each rotary motor is connected to an arm retainer and rotates it down to capture one of the user's arms. Each linear retractor is connected to withdraw and rotate one of the leg retainers which is thereby enabled to capture one of the user's legs and draw it towards the seat. After the ejection seat with the user disposed therein has cleared the vehicle from which ejection is being accomplished, and seat user separation is desirable, the four limb retainers are separated from the seat to release the user's limbs from the seat and to permit the user to separate from the seat and deploy his parachute if desired.

Other objects, advantages and novel features of the invention will become apparent from the following detailed description of the invention when considered in conjunction with the accompanying drawings wherein:

BRIEF DESCRIPTION OF THE DRAWINGS

FIG. 1 shows an ejection seat and a preferred embodiment of a limb retention system according to the present invention shown in one stage of operation;

FIG. 2 shows the seat and system of FIG. 1 with the limb retention system shown in a subsequent stage of operation;

FIG. 3 shows the seat and system of FIG. 1 with the limb retention system shown in a still subsequent stage of operation;

FIG. 4 is a diagrammatic representation of the limb retention system of FIG. 1; and FIG. 5 is a longitudinal section of a portion of the limb retention system of FIG. 1.

DESCRIPTION OF THE PREFERRED EMBODIMENT

Referring now to the drawings, wherein like reference characters designate like or corresponding parts throughout the several views, there is shown in FIG. 1 a seat 11, such as an aircraft ejection seat, slidably disposed such as on rollers on guide rails 13 fixedly connected to a vehicle or other structure. Seat 11 is configured to slide, such as on rollers, up and down on rails 13, such as is the case with an aircraft ejection seat. When the user of seat 11 desires ejection from the vehicle or otherwise desires to be securely fastened in seat 11, he pulls firing handle or D-ring 15 connected to seat 11, and thereby actuates ballistic initiator 17 connected to the handle as shown in FIG. 4. Firing handle 15 is preferably located conveniently at the front of seat 11 between the user's legs. In an ejection escape system for a vehicle, pulling of firing handle 15 initiates the process of ejection from a vehicle utilizing such a system. Ballistic initiator 17 can for example be a pyrotechnic gas generator producing pressurized gas by burning powder activated by a firing pin connected by a lanyard to firing handle 15 to strike a detonator cap connected to initiator 17 to fire the powder when handle 15 is pulled. When activated, ballistic initiator 17 activates or starts operation of gas generator 19 and controller or time or sequencer 21, for example by producing gases which are provided via conduit or ballistic gas line 23 to a pressure actuated gas generator 19 and via conduit or ballistic gas line 25 to a thermal battery utilized as a power supply in controller 21 to commence operation of the battery. By the time that the battery will have been able to produce sufficient electricity to drive controller 21, seat 11 should then be ready for separation of the various arm and leg restraints as is further discussed below. Alternatively, gas pressure produced by initiator 17 can activate a thermal battery of, within the logic circuitry of, or otherwise connected to controller 21, to generate electrical energy by heat from an exothermic chemical reaction. This electricity can then be stored in a capacitor whose discharge would then set the timers or timing of controller 21. Alternatively, an electric switch connected to controller 21 and gas generator 19 can be used in lieu of ballistic initiator 17 and, if desired, firing handle 15, to initiate operation of controller 21 and gas generator 19. Controller 21 can, for example, be a timer, a logic circuit having time delays and which sends triggering pulses to actuate various parts of the system, a microprocessor or an electronic programmer, and can also be used for sequencing the ejection process. Generator 19 is connected via respective conduits or ballistic gas lines 27, 29, 31 and 33 respectively to a rotary motor or rotary actuator 35, rotary motor or rotary actuator 37, drive mechanism or linear retractor and release device 39, and drive mechanism or linear retractor and release device 41, respectively, so that gases from the generator can power and operate the motors and retractors. Each motor 35 and 37 and retractor 39 and 41 is connected to seat 11 and to a rigid member 43, 45, 47 or 49, respectively, each configured to engage one of the user's limbs and draw it towards the seat. Motor 35, motor 37, retractor 39 and retractor 41 are respectively connected to operate or drive arm retaining member 43, arm retaining member 45, leg retaining member 47 and leg retaining member 49, each of which is configured to engage, capture, draw in towards seat 11 and restrain the user's right arm, left arm, right leg and left leg, respectively. Retainers or restraints 43, 45, 47 and 49 can for example be of aluminum, preferably without sharp edges and preferably covered with soft rubber, such as in a heat-shrink casing, where they contact the user, for his protection. Arm retainers 43 and 45 are each pivotably connected to seat 11 such as by an explosive bolt 65 or 67 respectively which is connected to the corresponding motor 35 or 37 respectively. Bolts 65 and 67 can for example each be an Explosive Bolt No. 113207 manufactured by Space Ordnance Systems, Inc., Placeritas Division, Saugus, California. Controller 21 is operatively connected such as electrically via electric line 51 to activate gas generator 53. Gas generator 53 can for example be an electrically actuated gas generator ignited by an electric squib, such as a seven watt electric squib. The output of gas generator 53 is connected via respective conduits or ballistic gas lines 55 and 57 to operate respective retractors 39 and 41. Controller 21 is also operatively connected such as electrically via electrical lines 59 and, respectively, 61 and 63 to respective explosive bolts 65 and 67 respectively connected to disengage respective arm retainers 43 and 45 when actuated. Gas generators such as can be used in the system of FIG. 4 can for example be pyrotechnic gas generators which burn powder to produce gas, and can be ignited by an electric squib (such as at seven watts) or by a pressure cap (such as at 500 psi).

Retractor 39 is shown in greater detail in a sectional view in FIG. 5. Retractor 39 includes a casing 69 provided with gas inlets 71 and 73 and forming three chambers 75, 77 and 79. Chamber 75 is connected to each of the other two chambers 77 and 79 via escape port or passage 81 and release inlet or passage 83, respectively. Double ended rack piston 85 can include a rigid, toothed rack having at each end a piston which can sealingly engage the walls of chamber 75. Rack piston 85 is slidably and sealingly disposed in chamber 75 so that it moves away from the inlet 71 or 73 from which gas pressure is being provided. The teeth of rack piston 85 engage the teeth of gear or pinion 87 which in turn engage the teeth of rack 89. Rack 89 is connected to leg retainer 47 by coupling 91 which permits leg retainer 47 to rotate on its longitudinal axis while not transmitting any of that rotational motion to rack 89, so that rack 89 does not rotate longitudinally while leg retainer 47 so rotates. Thus, translational motion of rack piston 85 in chamber 75 is transferred as rotational motion to pinion 87 and therefrom to rack 89 and leg retainer 47 as translational motion. Detent or roller 93 is connected to the interior of casing 69 in chamber 77 and is configured to engage partially helical groove 95 of leg retainer 47. Groove 95 is configured so that, as leg retainer 47 is withdrawn towards seat 11 and into chamber 77 by translational movement of rack piston 85, leg retainer 47 initially turns or rotates 90° on its longitudinal axis, but no more than that. Gear or ratchet wheel 97 is fixedly connected to pinion 87 to rotate therewith about a common shaft 99. Pawl 103 is configured to engage ratchet 97, is pivotably and sealingly connected to the wall of chamber 79, and includes an extension disposed in chamber 79 and capable of motion about its pivot under gas pressure from passage 83. Ratchet 97 and pinion 87 therewith are prevented from rotating in a clockwise direction in the view of FIG. 5 by compression spring 101 connected between casing 69 and pawl 103 urging pawl 103 against ratchet 97, and thus prevents premature loss of leg retainer 47. However, the portion of pawl 103 connected to spring 101 and disposed in chamber 79 is configured to compress spring 101 and release pawl 103 from ratchet 97 to thereby free pinion 87 while pressurized gas from inlet 73 entering chamber 79 via passage 83 exerts force against that portion of pawl 103 disposed in chamber 79. Linear retractor 41 has structure similar to that of linear retractor 39 shown in FIG. 5. For example, as is shown in FIG. 3, bearing 191 connects rack 189 to leg retainer 49 to permit leg retainer 49 to rotate longitudinally while not transmitting any of that rotational motion to rack 189 so that rack 189 does not rotate longitudinally while leg retainer 49 so rotates.

Motors 35 and 37 can each be any mechanism capable of pivoting or swinging respective arm retainers 43 and 45 to engage the user's arms. Motors 35 and 37 can each for example be a pneumatic motor. Alternatively, motors 35 and 37 can each be a piston and crank mechanism. In such a mechanism, respective line 27 or 29 provides pressurized gas to an inlet port of a linear actuator or a cylinder to urge a piston and a shaft fixedly connected at one end thereto to be drawn into the cylinder. The opposite end of the piston shaft is pivotably connected to one end of a straight rigid link whose opposite end is pivotably connected to one end of a straight rigid crank arm or to the edge of a rigid wheel. The opposite end of the crank arm or the center of the wheel, is fixedly connected to respective retainer 43 or 45 at or via the pivot of the retainer so that the retainer turns with the crank arm or wheel. The piston is initially held in place in the cylinder by a locking ring, such as a split locking ring, releasably connecting piston and cylinder and which is forced out by gas pressure acting on the piston. As the piston and shaft are withdrawn into the cylinder, the link and crank arm or wheel are also drawn thereto. As this occurs, the pivoting connections thereof, and the inability of the center of the wheel or the opposite end of the crank arm to be displaced, causes the wheel or crank arm, and the respective retainer 43 or 45 therewith, to swing or rotate about the pivot of the retainer. Such movement can be limited by limiting the stroke of the piston, such as by causing it to bottom out in the end of the cylinder. Gas pressure would then hold the piston in place in the cylinder, and retainer 43 or 45 in place on seat 11, until man/seat separation is desired. Retainer 43 or 45 movement could also be accomplished by having the gas urge the piston out of the cylinder.

Operation of the foregoing embodiment will now be described. Initially, the arms and legs of the user seated in seat or chair 11 are likely to be extended away from seat 11 to operate various aircraft (or other vehicle) controls. Also, the positions of retainers 43, 45, 47 and 49 are initially as shown in FIG. 1. Arm retainers 43 and 45 are initially raised out the way to respective positions at either side of the back of seat 11, as shown in FIG. 1. Extended leg retainers 47 and 49 can prevent the user's legs from straying too far beyond either side of seat 11 to areas no foot-operated vehicle controls would be located. A portion of rack piston 85 should initially be to the side of gear 87 distant from gas inlet 71 as shown in FIG. 5, to permit later ejection of retainer 47. When the user considers ejection from the aircraft or other vehicle to be necessary or desirable, he pulls firing handle 15 to initiate the ejection sequence. Pulling firing handle 15 causes ignition of ballistic initiator 17 and transmission of gas therefrom to pressure actuated gas generator 19 and controller 21 via respective ballistic gas lines 23 and 25. The gas pressure from ballistic initiator 17 activates pressure actuated gas generator 19, causing it to produce pressurized gas which is provided via respective ballistic gas lines 27, 29, 31 and 33 to respective rotary motor or actuator 35, rotary motor or actuator 37, linear retractor 39 and linear retractor 41 for operation thereof. Pulling firing handle 15 to begin ejection also causes seat 11 to be propelled up rails 13, which should but need not necessarily tend to draw the user's limbs in towards the seat so that they are more readily captured and retracted to the seat by retainers 43, 45, 47 and 49. However, the invention will operate properly without such initial movement of the seat, and limb capture and retention prior to seat 11 movement may be considered safer or otherwise more desirable. The gas from generator 19 causes actuators 35 and 37 respectively connected to arm retainers 43 and 45 to pivot or rotate respective arm retainers 43 and 45 downward thorugh an arc of 135° to engage, capture, withdraw towards seat 11, and hold in place on or seat 11, the user's right and left arms, respectively. Even if the user's arms are still extended or partially extended and he has not had time to withdraw them towards the seat, retainers 43 and 45 will still engage them and positively draw them towards the seat. Gas pressure then holds arm retainers 43 and 45 in their position of FIG. 2. Gas from generator 19 also passes through line 31 to enter chamber 75 of retractor 39 via gas inlet 71. This pressurized gas urges rack piston 85 forwardly in chamber 75 towards inlet 73, leg retainer 47 and the user's legs. As rack piston 85 moves forward, its teeth engaging and meshing with those of pinion 87 cause pinion 87 to rotate in a counter-clockwise direction when viewed looking towards seat 11 as shown in FIG. 5. This rotation of the teeth of pinion 87 which also engage and mesh with the teeth of rack 89, moving rack 89 translationally towards inlet 71 (the left side of FIG. 5) and the back of seat 11, causes withdrawal of leg retainer 47 into retractor 39. A detent, cam or roller 93 is connected to the interior side of the wall or casing 69 of chamber 77 and is configured to engage partially helical groove 95 of leg retainer 47. Groove 95 initially extends to either side of detent 93. Groove 95 of leg retainer 47 has a straight portion parallel to the longitudinal axis of leg retainer 47 initially disposed to either side of detent 93, and a diagonal portion connected thereto towards the hook end of retainer 47 traversing one-fourth of the circumference of retainer 47 and connected towards the hook end of retainer 47 to another straight portion also parallel to the longitudinal axis of retainer 47. As leg retainer 47 is withdrawn into retractor 39, detent 93 is drawn through groove 95 which cooperates therewith to force leg retainer 47 to rotate inwardly 90° or one-quarter turn, enabling the hook portion of leg retainer 47 to engage, capture and retain the user's right calf. Accordingly, as leg retainer 47 is withdrawn into chamber 77 of retractor 39, detent 93 and groove 95 cooperate to initially rotate leg retainer 47 one quarter-turn so that the user's right calf is engaged and captured and then withdrawn with leg retainer 47 towards seat 11 thereby. Bearing 91 prevents this rotational motion of retainer 47 from being received by or from otherwise affecting rack 89, so that the teeth of rack 89 remain in engagement with the teeth of pinion 87. Bearing 91 can for example, be a roller bearing or a ball bearing. If desired, rack 89 can be held in proper alignment with respect to pinion 87 by a guide or guide rails. Pinion 87 and ratchet 97 rotate together about the pivot provided by shaft 99. Spring 101 urges pawl 103 against ratchet or ratchet wheel 97 connected to pinion 87 to prevent premature withdrawal of leg retainer 47 from chamber 77 and insure secure retention of the user's right leg by leg retainer 47. Pressurized gas from inlet 71 continues to move rack piston 85 to cause withdrawal of leg retainer 47 into chamber 77 until movement of rack piston 85 exposes passage 81 to the gas, permitting the pressurized gas to escape into larger chamber 77, relieving the gas pressure applied to piston 85 and limiting withdrawal into chamber 77 of leg retainer 47. However, the cooperation of pinion 87, ratchet 97, pawl 103 and spring 101 prevents release of leg retainer 47 from retractor 39. The end of groove 95 nearest the hook end of leg retainer 47 also limits withdrawal of leg retainer 47 into chamber 77. The configuration and operation of linear retractor 41 and leg retainer 49 is similar to that of linear retractor 39 and leg retainer 47, except that the rotational direction of the corresponding groove in leg retainer 49 corresponding to groove 95 of leg retainer 47, and thus the direction of rotaion of leg retainer 49 when withdrawn towards seat 11 and into retractor 41, is opposite that of groove 95 and leg retainer 47, respectively, so that leg retainer 49 can engage the user's left calf and draw it towards seat 11 and clamp it in place thereon. Rotation or other movement of rotary actuators 35 and 37 and of arm retainers 43 and 45 can be limited, for example, by an orifice for release of gas pressure or by a rigid stop or detent. Thus, each leg retainer 47 and 49 is rotated inwardly by 90° or one-quarter turn and drawn in towards seat 11 to capture, drawn in towards seat 11 and retain in place, with respect to seat 11, each of the user's legs. Thus, the user's limbs are drawn in by retainers 43, 45, 47 and 49 towards or to seat 11, and seat 11 is now in the configuration shown in FIG. 2. Limb retention preferably should be complete within 200 to 300 milliseconds after commencement of ejection.

Gas produced by ballistic initiator 17 is also received by controller or timer 21 via line 25 to initiate operation of controller 21, for example actuation of a thermal battery of controller 21 and connected to provide power thereto. Controller 21 can then provide control or timing for other stages of seat 11 ejection. As ejection of seat 11 from the vehicle progresses, seat 11 is propelled up rails 13 and out of the vehicle. After a predetermined time has elapsed, permitting seat 11 and the user held therein to be safely separated from the vehicle from which ejection has been accomplished, it is desirable that the user be separated from seat 11 and that he be permitted to deploy his parachute so that he can accomplish a safe landing. Accordingly, after a fixed, predetermined time such as two to three (maximum of five) seconds after the user pulls firing handle 15, controller 21 provides an electrical signal via electric line 51 to ignite electrically actuated gas generator 53 which produces pressurized ballistic gas. Pressurized gas produced by gas generator 53 is then provided via respective gas lines 55 and 57 to respective linear retractors 39 and 41. In linear retractor 39, gas from generator 53 passes from line 55 through gas inlet 73 to enter the side of chamber 75 distant from gas inlet 71, and exerts gas pressure force on rack piston 85 which would urge it towards inlet 71 if pawl 103 were freed from ratchet 97. The gas from inlet 73 also passes through passage 83 to enter chamber 79 of retractor 39 and exert gas pressure force on the extension (which can be a deflection plate) of pawl 103 disposed therein in a direction opposite to, and having a magnitude greater than, the force exerted thereon by spring 101. The gas force is sufficient to overcome that of spring 101, thereby pivoting pawl 103 and lifting and releasing pawl 103 from ratchet 97, and permitting pinion 87, rack 89 and leg retainer 47 to move in directions opposite to their previous directions of movement. The pressurized gas in chamber 75 then urges rack piston 85 back towards inlet 71. As rack piston 85 is moved thereby, its teeth engage those of pinion 87 to rotate clockwise in the view shown in FIG. 5. The teeth of rotating pinion 87 engaging the teeth of rack 89 urge rack 89 and leg retainer 47 connected thereto out of chamber 77 and away from seat 11. As detent 93 travels in groove 95, the cooperation between detent 93 and groove 95 causes the hook of leg retainer 47 to be rotated back into a vertical position. Retractor 41 and retainer 49 operate similarly. The portion of rack piston 85 initially to the inlet 73 side of pinion 87 and the portion of groove 95 initially to the inlet 71 side of detent 93, enable pinion 87 to impel leg retainer 47 out of drive mechanism 39. There is no stop at the end of groove 95 adjacent bearing 91, so that as pinion 87 impels leg retainer 47 out of chamber 77, there is nothing to limit movement at that end of leg retainer 47, and when detent 93 reaches the end of groove 95 adjacent bearing 91, detent 93 falls out of the end of groove 95 adjacent bearing 91 and pinion 87 causes rack 89, bearing 91 and leg retainer 47 to be ejected from chamber 77 and seat 11. If necessary, groove 95 can be extended to bearing 91 and rack 89. The operation of linear retractor 41 to release leg retainer 49 from seat 11 is similar to that of linear retractor 39 for releasing leg retainer 47. The electrical signal produced by controller 21 to actuate gas generator 53 is also provided via electric lines 59, 61, and 63 to ignite explosive bolts 65 and 67 respectively connecting arm retainers 43 and 45 to seat 11, causing separation of arm retainers 43 and 45 from seat 11. Thus, at the desired time of seat/man separation, limb retainers 43, 45, 47 and 49 are separated from seat 11 as is shown in FIG. 3, arm retainers or restraints 43 and 45 being separated sideways from seat 11 and leg retainers or restraints 47 and 49 being separated forwardly from seat 11. The user is now free to separate himself from seat 11 and to deploy his parachute. The separation of leg restraints 47 and 49 is further aided, once pawl 103 has been released from ratchet 97, by momentum imparted to rack 89 and by the natural tendency of the user to exert force with his legs against leg retainers 47 and 49 when he desires to be separated from seat 11.

It should be understood that explosive bolts 65 and 67 can be replaced by explosive nuts which, when electrically actuated, force respective pivot bolts connecting respective arm retainers 43 and 45 to seat 11 away from seat 11, thereby also releasing and forcing arm retainers 43 and 45 from seat 11. The hooks of leg retainers 47 and 49 can be initially vertically positioned with respect to the seat with the hooks up and down. If side guards are used with seat 11, these side guards can be provided with recesses and leg retainers 47 and 49 can be configured to fit in these recesses so that leg retainers 47 and 49 do not interfere with free movement of the user's legs beyond that intended to be provided by the seat 11 side guards. Also, in lieu of rack 89 and bearing 91, a cylindrical rack can be used having circumferential teeth so that rotation of rack 89 resulting from rotation of leg retainer 47 would not prevent meshing of the teeth of rack 89 and pinion 87. Controller 21 can alternatively be a ballistic controller incorporating various ballistic time delays to provide pressurized gas at predetermined times via gas lines to pressure actuated gas generators replacing any electrically actuated gas generators in the present invention. Any gas lines and pressure actuated gas generators in the present invention can be respectively replaced with electric lines and electrically actuated gas generators. For example, ballistic initiator 17 can be replaced with an electric switch and power supply connected to activate controller 21 and an electrically actuated gas generator replacing generator 19. If electric motors replace motors 35 and 37 and retractors 39 and 41, the system of FIG. 4 can be completely electric if desired. If ballistic initiator 17 is sufficiently powerful, generator 19 can be eliminated. The present invention is not limited to ejection from aircraft, but can be used in any moving vehicle or moving or stationary environment, for example where only secure retention is needed, such as when an automobile accident is imminent. Any durations for retention and separation can be utilized, although those given are preferred for aircraft ejection. If desired, separate gas generators can be used for restraining the arms and the legs of the user. Any type of gas generator can be used in the present invention. The various angles of rotation and pivoting can be varied if desired, for example by varying groove 95. Dummies and animals could also be protected by the present invention.

Some of the many advantages of the invention should now be readily apparent. For example, a novel limb retention system has been provided which is capable of capturing, withdrawing and positively retaining the user's limbs in a seat. This system is capable of positive capture, retraction and restraint of the limbs of a user. It is especially useful in systems such as a personnel ejection system wherein rapid and secure protection of the user's limbs is necessary to avoid injuries to the limbs such as could result from limb flail. This system can be seat mounted so that there is no equipment or garment for the crew member to wear or premount. This means that there is no extra gear to wear or stow away when not in use. Any possible damage to the vehicle in the handling of such equipment is thereby eliminated. Since nothing need be worn by the user, it is not necessary that the limb retention system be fitted to the individual user, and only one system need be provided for each seat in which it is desired to utilize the system. It should be understood that this system can be used in non-ejection seat type systems. For example, it could be utilized to restrain the user's limbs in an automobile when a serious automobile crash is sensed for example, by appropriately mounted strain gauges or other impact sensors. Since the system positively engages and draws in the user's limbs, no additional attachments by the user to the system are necessary. Furthermore, since no additional attachments are required for utilization of the present invention, in the event of an emergency ground level egress, there are no additional disconnects, resulting in a safer and more rapid escape from the aircraft. Also, since the user's limbs are positively captured and drawn toward seat 11, there is no need for him to physically draw in his limbs to the seat, thereby assuring full limb retention system operation, and preventing any vehicle structure from interfering with or striking the user's limbs while ejection is occurring but before the user has been able to fully draw in his limbs to his seat. Before being actuated, the limb engagement members of the system are held out of the way so as not to interfere with movement of the user's limbs nor with utilization of any vehicle instrumentation or controls. All limbs are drawn in towards, and held in place with respect to the user's seat or chair, which can be accomplished utilizing a single power source and simultaneous actuation. Positive capture, withdrawal and restraint is provided to the user's limbs which can thus be restrained within the confines of safe envelope dimensions. The downward motion of the arm retainers helps position the user's arms in the event that they are not in the proper ejection position.

Obviously, many modifications and variations of the present invention are possible in light of the above teachings. It is therefore to be understood that within the scope of the appended claims, the invention may be practiced otherwise than as specifically described.

What is claimed is:

1. Apparatus for capturing and restraining the limb of a subject during normal ejection procedure from an aircraft, comprising:
   an ejection seat;
   a pair of rigid arm restraint members each pivotally connected to opposite sides of the seat on a transverse axis through the back of said seat, said arm members having a non-obstructing raised position and formed to engage and restrain the subject's arms in a lowered position;
   a pair of rigid leg restraint members each slidably and rotatably connected to opposite sides of the seat on parallel axes extending from said seat, said leg members having a non-obstructing forward position and formed to engage and restrain the subject's legs in a rearward position;
   control means responsive to an ejection command signal for actuating said arm and leg restraint members from the raised and forward positions to the lowered and rearward positions, respectively, and including retractor actuator means operatively connected to said seat and to said leg restraint members for releasably rotating and retracting said leg members between said positions having first gas generating means for producing a first quantity of gas under pressure, a casing fixed to said seat, a piston slidably disposed in said casing and receiving and displaced in said casing by said first quantity of gas, and transfer means connected between said piston and one of said leg members for displacing said leg member with respect to said seat with movement of said piston; and cam means connected between said casing and said leg member for rotating said leg member about its longitudinal axis when it is displaced by said retractor means.

2. Apparatus as recited in claim 1 wherein said cam means comprises:

a groove configured in said rigid leg restraint member and including a portion traversing a portion of the cross-sectional perimeter of said rigid leg restraint member; and a following member connected to said casing and configured to slidably engage said groove.

3. Apparatus for capturing and restraining the limbs of a subject during normal ejection procedure from an aircraft, comprising:

an ejection seat;

a pair of rigid arm restraint members each pivotally connected to opposite sides of the seat on a transverse axis through the back of said seat, said arm members having a non-obstructing raised position and formed to engage and restrain the subject's arms in a lowered position;

a pair of rigid leg restraint members each slidably and rotatably connected to opposite sides of the seat on parallel axes extending from said seat, said leg members having a nonobstructing forward position and formed to engage and restrain the subject's legs in a rearward position;

control means responsive to an ejection command signal for actuating said arm and leg restraint members from the raised and forward positions to the lowered and rearward positions, respectively, and including retractor actuator means operatively connected to said seat and to said leg restraint members for releasably rotating and retracting said leg members between said positions having first gas generating means for producing a first quantity of gas under pressure, a casing fixed to said seat, a piston slidably disposed in said casing and receiving and displaced in said casing by said first quantity of gas, and transfer means connected between said piston and one of said leg members for displacing said leg member with respect to said seat with movement of said piston; and safety means connected to said transfer means for releasably permitting movement of said piston and of said leg restraint members only in respective predetermined directions having a ratchet fixedly and coaxially connected to said transfer means, a pawl slidably engaging such ratchet for releasably permitting movement of said ratchet in only one direction, first force exerting means connected to said pawl and to said casing for urging said pawl against said ratchet, and second force exerting means connected to said pawl for overcoming said first force exerting means and urging said pawl away from said ratchet when release of said rigid leg restraint members is desired.

4. Apparatus for capturing and restraining the limbs of a subject during normal ejection procedure from an aircraft, comprising:

an ejection seat;

a pair of rigid arm restraint members each pivotally connected to opposite sides of the seat on a transverse axis through the back of said seat, said arm members having a non-obstructing raised position and formed to engage and restrain the subject's arms in a lowered position;

a pair of rigid leg restraint members each slidably and rotatably connected to opposite sides of the seat on parallel axes extending from said seat, said leg members having a non-obstructing forward position and formed to engage and restrain the subject's legs in a rearward position;

control means responsive to an ejection command signal for actuating said arm and leg restraint members from the raised and forward positions to the lowered and rearward positions, respectively, and including retractor actuator means operatively connected to said seat and to said leg restraint members for releasably rotating and retracting said leg members between said positions having first gas generating means for producing a first gas under pressure, a casing fixed to said seat, a piston slidably disposed in said casing and receiving and displaced in said casing by said first gas, and transfer means connected between said piston and one of said leg members for displacing said leg member with respect to said seat with movement of said piston; and separation means connected to receive said first gas for separating said rigid arm and leg restraint members from said seat and including controller means connected to receive said first gas for producing a separation signal at a predetermined time after receiving said first gas, breaking means connected between said seat and a said rigid arm restraint member and connected to receive the separation signal for breaking the connection between said rigid member and said seat, and second gas generating means connected to receive the separation signal for producing a second gas under pressure upon sensing the separation signal, wherein said retractor actuator means is connected to receive the second gas so that said piston receives and is displaced in said casing by said second gas in a direction opposite that for said first gas.

* * * * *